United States Patent [19]
Zimmerman

[11] Patent Number: 5,309,852
[45] Date of Patent: May 10, 1994

[54] SEED DRILL

[76] Inventor: Robert Zimmerman, Box 6, Almira, Wash. 99103

[21] Appl. No.: 847,784

[22] Filed: Mar. 5, 1992

[51] Int. Cl.$^5$ .............................................. A01B 35/16
[52] U.S. Cl. ................................. 111/121; 111/140; 111/195; 172/538; 172/172; 172/177; 172/770; 172/771; 172/731
[58] Field of Search ................. 111/121, 195, 140; 172/538, 172, 177, 765, 770, 771, 731, 721

[56] References Cited

U.S. PATENT DOCUMENTS

| | | | |
|---|---|---|---|
| 3,077,290 | 2/1963 | Rehder | 111/195 X |
| 3,085,635 | 4/1963 | Livermore | 172/765 X |
| 3,177,830 | 4/1965 | Zimmerman | 111/85 |
| 3,180,291 | 4/1965 | Loomans | 111/195 X |
| 3,319,590 | 5/1967 | Zimmerman | 111/85 |
| 3,385,243 | 5/1968 | Zimmerman | 111/85 |
| 3,923,104 | 12/1975 | Tibbs | 172/765 X |
| 4,461,355 | 7/1984 | Peterson et al. | 111/140 X |
| 4,671,193 | 6/1987 | States | 111/195 X |
| 4,691,645 | 9/1987 | Anderson | 111/195 X |
| 4,844,174 | 7/1989 | Zimmerman | 172/538 |

OTHER PUBLICATIONS

Yetter Mfg. advertisement–*Farm Journal*, Mid–January 1992.
"Superseeders" brochure, John Deere (1990)–9000 Series Press–Wheel Drills, pp. 20–27.

*Primary Examiner*—Randolph A. Reese
*Assistant Examiner*—Christopher J. Novosad
*Attorney, Agent, or Firm*—Wells, St. John, Roberts, Gregory & Matkin

[57] ABSTRACT

A seed drill includes a novel planting assembly combining press wheels for packing angular sides of a furrow and a runner immediately behind and longitudinally aligned with the press wheel. The runner extends rearwardly from beneath the press wheel and is transversely guided on the press wheel structure to maintain it in longitudinal alignment within an open longitudinal slot cut through the soil and intersecting the base of the packed furrow. Seed is dropped into the open slot prior to being covered with soil. Moist soil can be packed along the sides of the furrow to maintain the furrow in an open condition during seed germination and plant emergence. Highly accurate planting depth control can be achieved, with provision for upward relative movement of the runner as required by encountered field conditions.

47 Claims, 13 Drawing Sheets

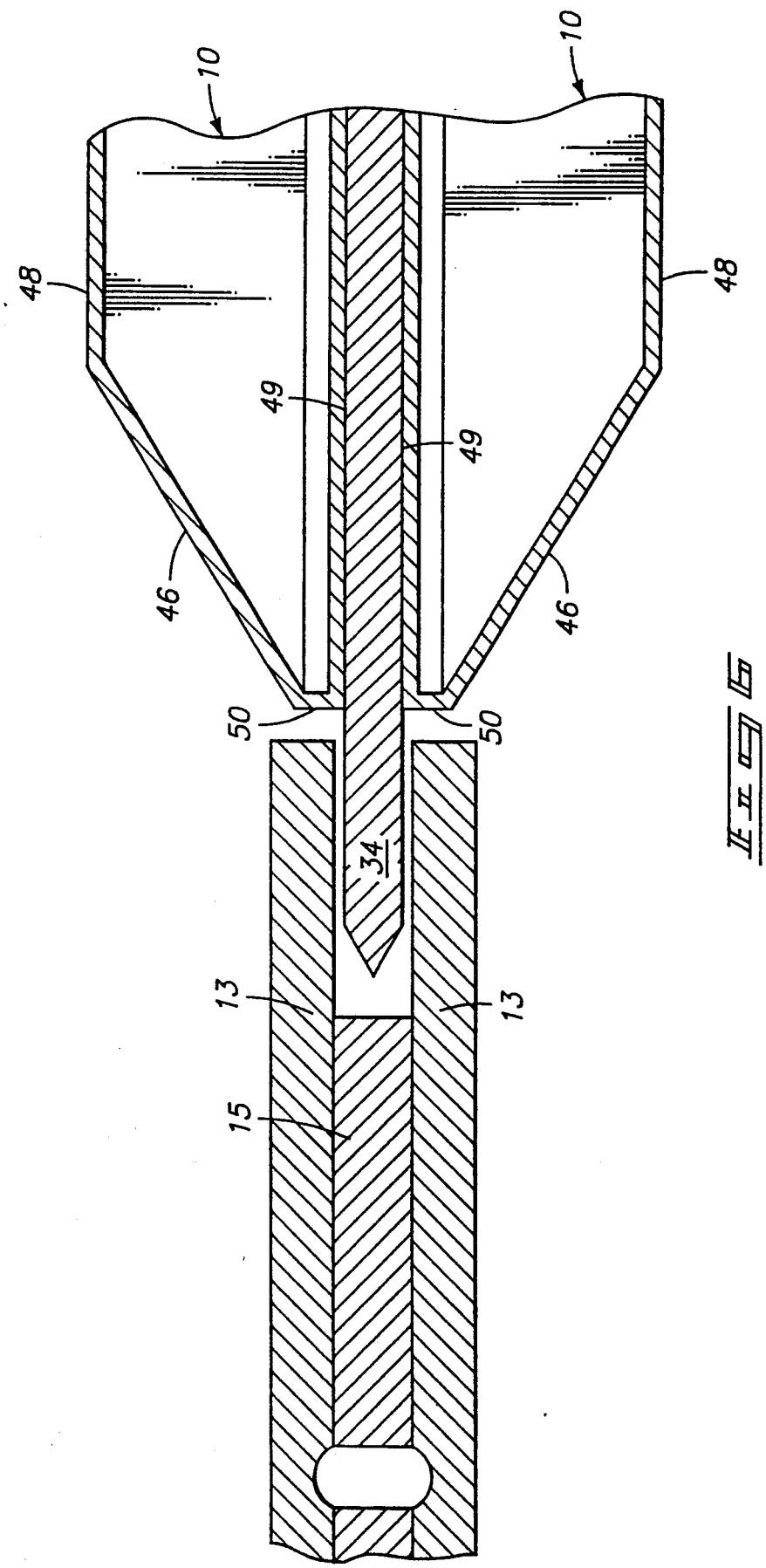

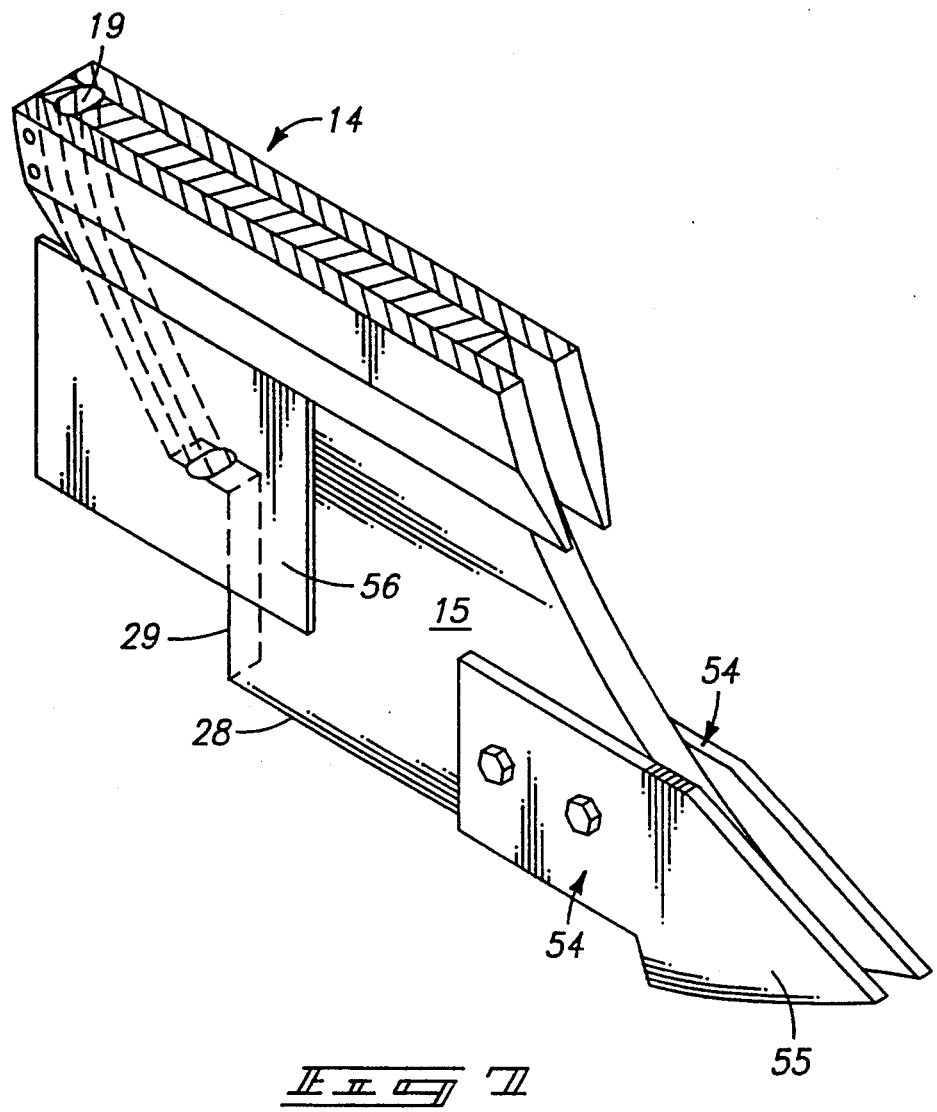
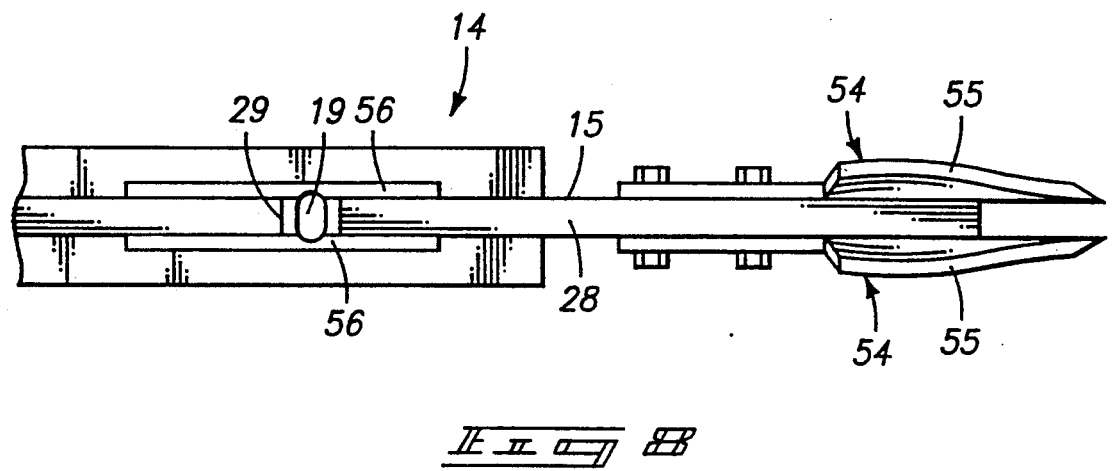

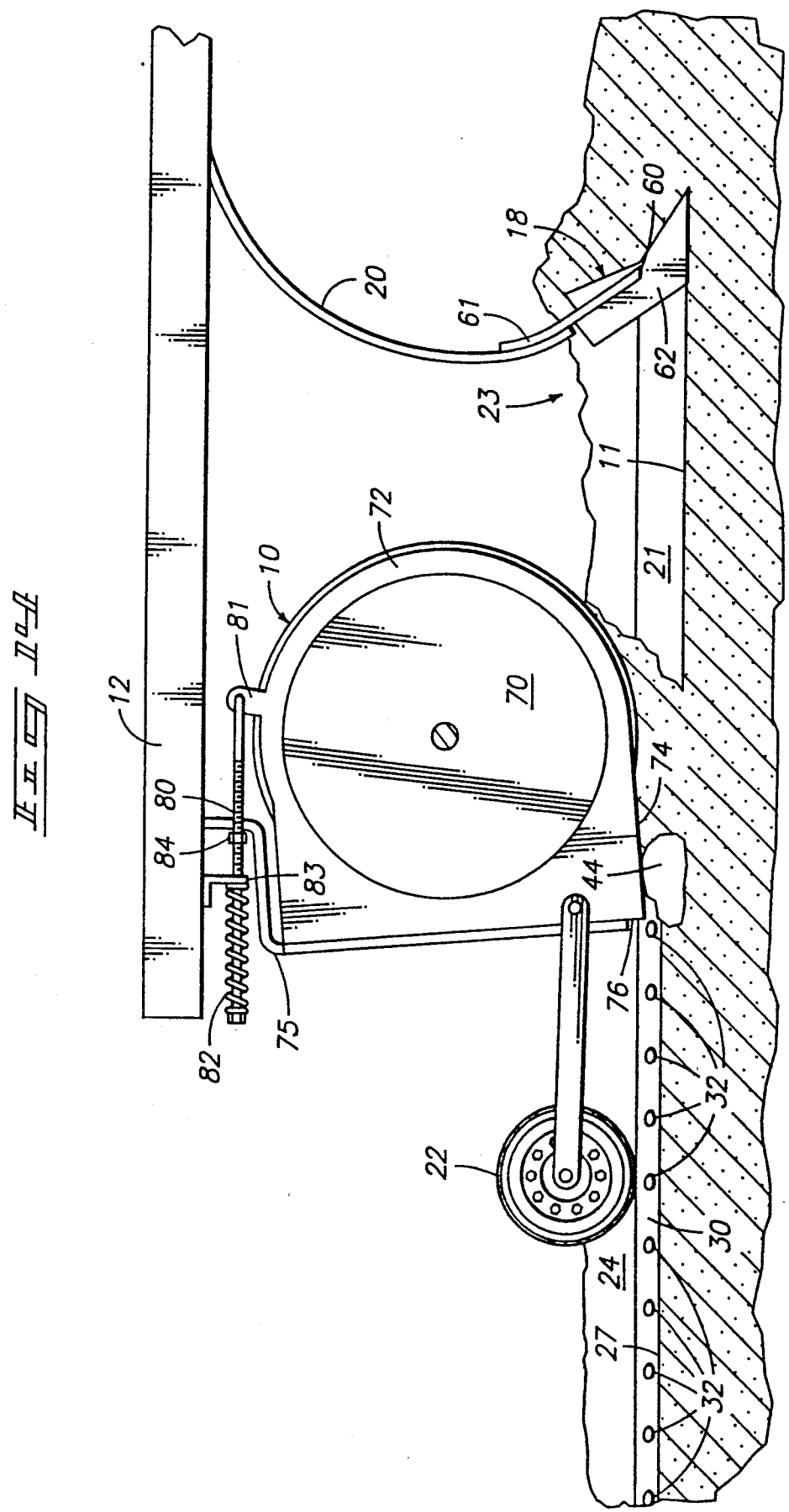

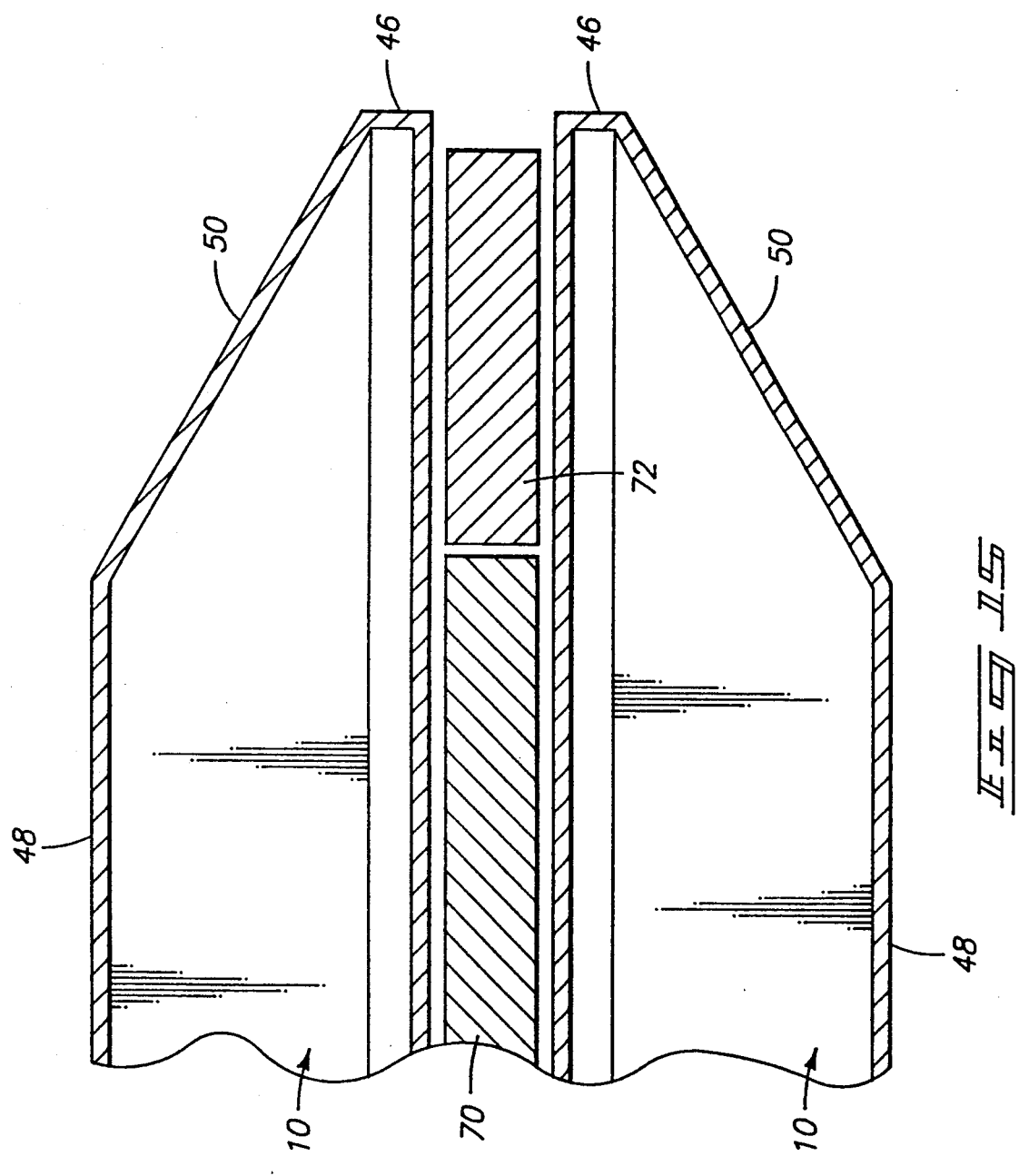

SEED DRILL

TECHNICAL FIELD

This disclosure pertains to seed drills for planting crops such as grains. It specifically relates to improvements in placement of seeds within an open longitudinal slot of a preset depth along the base of a packed deep furrow.

BACKGROUND OF THE INVENTION

This invention relates to improvements in a seed drill of the type generally disclosed in my U.S. Pat. No. 3,177,830, which was issued on Apr. 13, 1965. Modifications of this type of seed drill are disclosed in my U.S. Pat. No. 3,319,590, issued May 16, 1967, U.S. Pat. No. 3,177,830, issued Apr. 13, 1965, U.S. Pat. No. 3,385,243, issued May 28, 1968 and U.S. Pat. No. 4,844,174, issued Jul. 4, 1989. The disclosures of my four prior patents are hereby incorporated within this disclosure by reference.

The seed drills described in my referenced U.S. patents are designed for deep furrow seeding of crops. Seed is planted at the bottom of a furrow having packed sloping sides. This is accomplished by placing the seed into the slotted soil behind a shovel forward of and followed closely by press wheels that pack the sides of the open furrow. The press wheels pack the sloping sides of the furrow after seed placement in an attempt to assure accurate control of both planting depth and proper soil coverage over the seeds.

The above-referenced inventions were developed primarily for use in soil conditions where subsurface moist soil was covered by a substantial layer of dry loose soil. Such conditions are prevalent in the northwestern United States where winter wheat is grown by dry land farming techniques. While the referenced inventions have been widely adopted and have been proven to enhance seed germination and resulting crop yields when used, it is recognized that substantial variations in planting conditions continue to exist even where such improvements are used. This can be attributed to the natural variations that occur in the subsurface elevation of the moist soil and to surface undulations encountered where fields are not perfectly flat.

Under normal conditions, such planting equipment must be preset to place seed at an average depth that will normally locate it in moist soil. However, where the soil moisture line is below the average elevation for a field or where the equipment must span a slight dip in the soil contour, the planting equipment will place seeds in drier soil than is desirable. Such soil is very unstable and likely to slough downwardly to partially fill the furrow above the seed. When this occurs, expected growth from the germinating seed will be disrupted by the unwanted soil cover. This is particularly detrimental if there is been an intervening rain that forms a crust in the covering soil through which the emerging plant growth must penetrate.

Many of the problems of prior art drills, which usually required staggered placement of seed openers across the drills, were solved when an in-line version of the drill shown in U.S. Pat. No. 3,319,590 was commercially introduced. In these drills, the seed placement boot was overlapped within the following press wheels. The furrow opening boot was relatively narrow and could be effectively pulled through the field in a transverse straight line relationship of the shovel openers and press wheels.

This drill became very popular in summer-fallow areas. However, it was not without problems. It could not travel through much trash or straw when a furrow deeper than four inches was required to reach moist soil. In some of the drier areas, users were forced to revert back to staggered drills.

Later development of notched pressed wheels (U.S. Pat. No. 4,844,174) gave the in-line drills much better trash clearing capabilities, but the drills still encountered problems where five to six inches of dry soil was encountered. Under these drier conditions the pointed opener had to be able to retract rearwardly into the press wheels to clear field obstacles. It was physically impossible to design an opener of this design which could lift sufficient moist soil to form a covering over the sides of the furrows and hold the packed furrows open after seeding. In many situations three to four inches of dry soil would fall back over planted seed in the resulting deep furrows.

An ideal drill should produce a planting furrow, whether shallow or deep, with no dry dirt located over the seeds. It should position grain seeds approximately one to two inches in packed moist soil with very consistent accuracy. Other types of seeds should be planted very accurately at depths ranging between one-four to one-half inch or even less.

Recognized shortcomings in the planting accuracy of the drills described in my prior patents have led me to the discovery of a new relationship between the planting runner for placement of seeds and the press wheels that pack the furrow sides as disclosed herein. With this new drill, because of the relative locations of the component parts in a planting sequence, each operation carried out by these component parts contributes to formation of a perfect furrow and accurate seed placement. Seed is planted in a carefully defined slot after furrow formation and packing has been completed. No uncontrolled seed coverage can occur in the packed furrow. This will result in substantially higher yields and eliminate or minimize the necessity of reseeding, regardless of weather encountered after the seeding sequence has been carried out by use of this improved drill.

BRIEF DESCRIPTION OF THE DRAWINGS

Preferred embodiments of the invention are described below with reference to the accompanying drawings, in which:

FIG. 6 is an enlarged fragmentary sectional view taken along line 6—6 in FIG. 1;

FIG. 7 is a fragmentary perspective view of the runner;

FIG. 8 is a bottom view of the assembly shown in FIG. 7;

FIG. 9 shows a reference position;
FIG. 10 shows a shallow planting position;
FIG. 11 shows a deep planting position;
FIG. 12 shows a raised transport position;
FIG. 14 is a view similar to FIG. 13, showing a raised position of the runner;
FIG. 15 is a fragmentary sectional view taken along line 15—15 in FIG. 13.

DETAILED DESCRIPTION OF THE PREFERRED EMBODIMENTS

This disclosure of the invention is submitted in furtherance of the constitutional purposes of the U.S. Patent Laws "to promote the progress of science and useful arts." U.S. Constitution, Article 1, Section 8.

Figure 18:
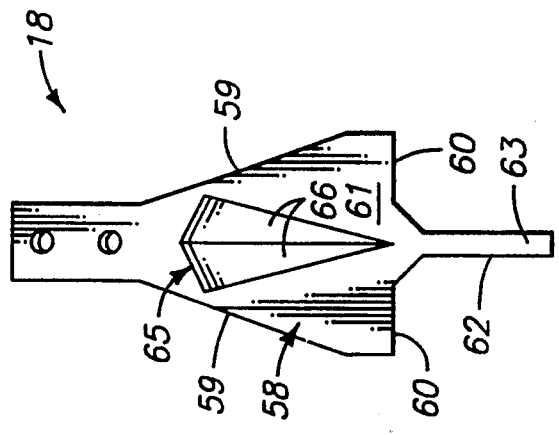
FIG. 18 is a front view.
Figure 17:
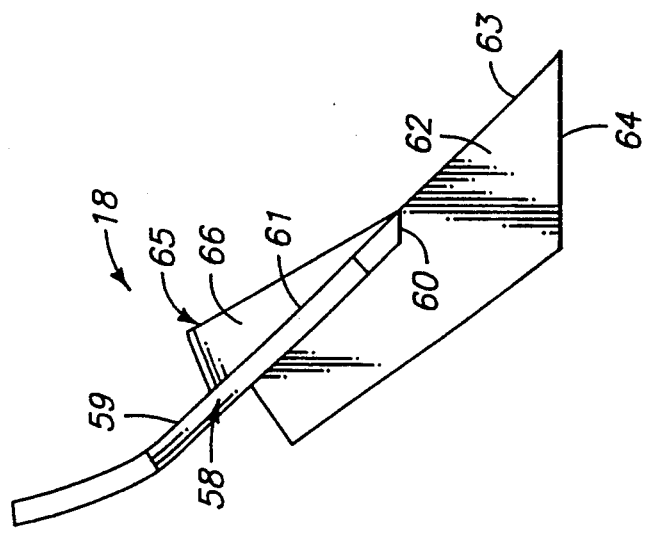
FIG. 17 is a side elevation view.
Figure 16:
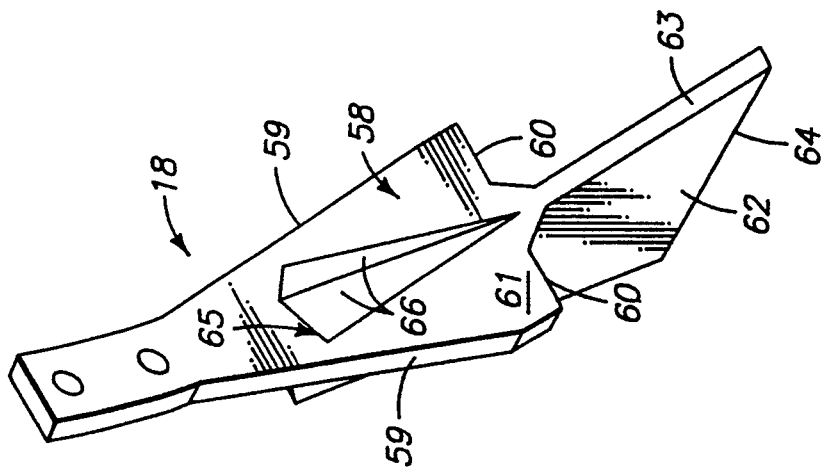
FIG. 16 is a front perspective view of a shovel.

Details of a first and preferred embodiment of a planting assembly for a seed drill are shown in FIGS. 1-8. FIGS. 9-12 diagrammatically show various working positions of the runner relative to an associated press wheel and coulter. FIGS. 13-15 illustrate the basic features of a second embodiment of a planting assembly. FIGS. 16-18 illustrate details of a novel furrow-opening shovel usable in conjunction with either embodiment of the illustrated planting assemblies.

The described first and second embodiments of a planting assembly have been developed primarily for planting grains in dry field conditions where a moist subsurface is covered by a surface layer of dry loose soil. However, their practical field applications are not limited to such conditions. They can also be used for planting seed at more shallow depths in moist surface soil conditions where formation of deep furrows is not required. They are also applicable to no-till applications, where seed is planted in a field containing stubble from a prior crop without cultivation of the field prior to seeding, and in minimum-till situations where prior field cultivation is limited and relatively shallow in depth.

The seed drills shown in FIGS. 1-8 of the accompanying drawings utilize a multi-stage development of packed furrows. The furrows are typically first cut by passage of an opener, such as a double disk coulter or shovel. The lowermost portion of the furrow produced by the opener should form a longitudinal slot below the intended base of the packed furrow.

The sides of the furrow are next packed in oppositely sloping configurations by the rolling pressure of opposed press wheel surfaces that define the furrow side slopes. After the furrow sides have been packed, the slot at its base is temporarily filled. Immediate passage of a narrow vertical runner guided transversely between the press wheels reshapes an open seed-receiving slot extending beneath and behind the press wheels.

Seed is dropped into the open slot in longitudinal alignment with the runner that shapes it. The slot is subsequently closed by passage of a packing wheel. Moist soil is firmed around the seed as the slot is closed, insuring effective seed germination.

The general details of the present seed drill and planting assembly are best illustrated by reference to FIG. 1.

It is developed about paired press wheels 10 rotatably mounted about a transverse axis on a supporting frame 12. The paired press wheels 10 have tapered or conical surfaces 50 leading to a rim 46. The surfaces 50 are capable of packing the sloping sides of a longitudinal furrow as they roll through it. The illustrated sloping sides 24 of the packed furrow lead downwardly to a furrow base 26.

A runner 28 extends rearwardly from beneath the paired press wheels 10. Runner 28 is transversely guided on the paired press wheels 10 to maintain it in longitudinal alignment within an open longitudinal slot 30 that intersects the packed furrow base 26. Delivery means is provided for dropping seeds 32 into slot 30. Runner 28 includes a front point 25 positioned closely adjacent to the periphery of a coulter 34 positioned between the paired press wheels 10.

The seeds 32 are deposited within open slot 30 immediately behind the runner 28. The seed-receiving slot extends vertically between the furrow base 26 intersected by it and a bottom slot surface 27 on which the delivered seeds 32 are supported.

Runner 28 is elevationally supported at the lower end of an upright boot 14 movably mounted relative to frame 12. The sides of boot 14 straddle a circumferential coulter 34 that rolls in unison between the paired press wheels 10. The primary purpose of the illustrated coulter 34 is to either cut or reestablish a see-receiving slot along the base of the packed furrow. A secondary benefit is its inherent resistance to side slippage of the seed drill when operated along hillsides.

Runner 28 is mounted for angular movement along an arc centered about the transverse axis of the paired press wheels 10. An upright shank 16 is engaged behind the boot 14 for yieldably urging it in a forward direction toward the paired press wheels 10.

Tension springs 36 are operably connected between boot 14 and shank 16 for normally holding runner 28 at a preset working position within the open slot 30. A typical working position for runner 28 is illustrated in FIG. 1. The springs 36 allow runner 28 to move upwardly relative to the shank 16 in response to engaged soil conditions. Limit means, illustrated by a horizontal bar 38 on the shank 16 and a transverse yoke 40 on the boot 14, define the normal working position of the boot 14 and runner 28 relative to the shank 16.

Shank 16 is also movably mounted relative to the supporting frame 12. It is transversely pivoted to frame 12 at 17. An overlapping leaf spring 42 interconnected between frame 12 and the top end of shank 16 resists rearwardly directed pressure against the shank 16 and aligned boot 14. The leaf spring 42 yieldably resists rearward motion of the boot 14 relative to the press wheels 10, but allows the boot 14 and runner 28 to move rearwardly as required in order to clear a subsoil obstacle, such as a rock 44 (see FIG. 5). The leaf spring is preferably preset to provide slight working clearance between the front edges of boot 14 and the rims 46 of the associated press wheels 10.

The press wheels 10 comprise a pair of oppositely facing press wheel elements. The two opposed elements can be separately formed or fabricated as an integral unit. Each has a circular rim 46 centered about a press wheel transverse axis. Each also includes a coaxial circular wall 48 that is perpendicular to the transverse axis and is offset from rim 46 in a direction parallel to the transverse axis. The diameter of the circular wall 48 is less than the diameter of rim 46. Circular wall 48 can be planar or can be inwardly dished.

A coaxial conical wall 50 completes the basic structure of each press wheel element. It joins the rim 46 and circular wall 48. The conical wall 50 is inclined outwardly from the rim 46 (see FIG. 6).

The press wheel elements, when formed separately, will also normally include an inner circular wall 49 that is also perpendicular to its transverse axis and is transversely spaced from wall 48 to complete a hollow enclosed wheel structure. However, wall 49 is not vital to the operative exterior surfaces of the press wheels 10 and can be omitted or modified in the case of integrally formed press wheels.

The press wheels shown in the drawings are designed for deep furrow seeding, along furrows that typically have depths greater than two inches below the field surface. Examples of deep furrows include furrows having depths of three to six inches, or even more. When used for no-till field applications and for planting seeds in shallow furrows, the widths of the conical walls 50 across the press wheels 10 can be substantially decreased, thereby permitting the row spacings to be decreased as well.

The periphery of the illustrated press wheels has a continuous and uninterrupted circular configuration. However, it is to be understood that the press wheel periphery configuration can be interrupted by open recesses of the type taught in my U.S. Pat. No. 4,844,174 where the benefits of such recesses are desired by a user.

The circumferential coulter 34 that projects radially outward from between the rolling press wheel elements cuts a vertical slot 30 between the packed sloped sides 24 of a furrow. Coulter 34 is perpendicular to and coaxially centered about the transverse axis of the press wheels 10. The rims 46 of the press wheel elements lead inwardly to the coulter 34, which is abutted by them. The outside diameter of coulter 34 is greater than the outside diameter of the abutting rims 46.

Coulter 34 can be formed as a separable circular disk or as an annular element joined between opposed press wheel elements. It also might be fabricated integrally with the associated press wheels 10 as a unitary rolling member. Coulter 34 rotates in unison with a pair of separately fabricated press wheels 10 about a common central axis. The outer periphery of coulter 34 is preferably sharpened to assist in penetrating moist soil through which it rolls during formation of the planting slot 30.

The upright boot 14 mounted behind the press wheels 10 overlaps and transversely straddles the side surfaces of coulter 34. Boot 14 can be effectively fabricated from three layers of rigid material, as illustrated in FIG. 6. These layers include a center plate 15 and two side plates 13. The thickness of center plate 15 should be substantially equal to the thickness of coulter 34. The overlapping side plates 13 should not project beyond the transverse thickness of rims 46 on the press wheels 10.

The front edges of side plates 13 and center plate 15 are shaped along arcs complementary to the adjacent peripheral configurations of rims 46 and coulter 34, respectively. The side plates 13 can be made from rigid plastic resins that provide frictional bearing surfaces between boot 14 and the press wheels 10 and coulter 34. Bearing pads or rollers (not shown) can be provided as necessary in order to eliminate frictional resistance and wear between boot 14 and coulter 34.

Runner 28 maintains slot 30 in an opened condition and refines the slot configuration as it slidably moves within the open slot 30, thereby physically preventing soil from falling within the slot confines until seeds 32 have been dropped within it. Runner 28 is located at the lower end of the boot 14 to maintain the boot 14 in longitudinal alignment within the slot 30 cut through the soil by rolling engagement of coulter 34. Runner 28 is shown as being integral with center plate 15, but can be separably fabricated and releasably joined to it if desired. The forward end of runner 28 is positioned immediately adjacent to the periphery of the coulter 34 and is pointed to complement the shape of coulter 34 and minimize any gap between them.

Seed is delivered from a conventional storage box and a seed metering assembly (not shown) of conventional design that supply a controlled volume of seeds to a flexible seed delivery tube 31. The lower end of the seed delivery tube 31 directs the seeds into an arcuate duct 19 formed along the upright rear edge of boot 14. The bottom end of this duct leads to an opening rearwardly adjacent to the back edge 29 of runner 28. Thus, individual seeds can drop freely through boot 14 and are deposited behind the moving runner 28.

To assure accurate seed placement within the side walls of the receiving soil slot 30, thin vertical plates 56 overlap the rear edges of runner 28. The plates 56 prevent soil from falling from the sides of slot 30 until the falling seeds 32 are deposited at the bottom of the slot.

Shank 16 is preferably formed from two transversely spaced rigid plates. It is pivoted to frame 12 at 17. The upright front edges 52 of shank 16 have an arcuate shape centered about the transverse axis of press wheels 10.

The bar 38 that anchors springs 36 to shank 16 extends forwardly between the two parallel plates from a threaded collar 39. Collar 39 is threadably engaged about a shaft 41 rotatably supported at the rear of shank 16. The upper end of shaft 41 is provided with a bevel gear connection to a manual crank arm 37 used to elevationally adjust bar 38 along the height of shank 16. Bar 38 therefore provides an adjustable bottom limit to the working position of runner 28 within the open slot 30.

The rear edge of boot 14 is provided with bearings that engage the front edges 52 along shank 16. These bearings are illustrated as transversely projecting rollers 53 that ride along the edges 52. The engagement between rollers 53 and shank 16 permits rearward forces to be directed from boot 14 to shank 16 in opposition to the forces of leaf spring 42. The separate structures of shank 16 and boot 14 permits either to be readily replaced when necessary.

The upper ends of springs 36 are threadably connected to the boot 14 at each of its respective sides to permit adjustment of the spring forces that maintain boot 14 in its normal working position. The normal working position of boot 14 relative to supporting frame 12 is defined by the engagement of bar 38 by the yoke 40 that rearwardly straddles the sides of shank 16. This combination of spring adjustment and limit adjustment assures accurate elevational positioning of runner 28 within the seed-receiving slot 30.

The front end of runner 28 includes side points 54 that overlap the side surfaces of coulter 34. The points 54 can best be seen in FIGS. 7 and 8. Each point includes a slightly flared wing 55 that disrupts the engaged side walls of the slot cut at the base of the furrow by rolling action of coulter 34. The scraping action of wings 54 in the moist soil at the sides of the slot fills that portion of the slot not maintained in an open condition by the presence of runner 28.

In most instances, the runner elevation will be such that its lowermost edge is at an elevation above the lowermost elevation of coulter 34. The purpose of runner 28 in this first embodiment is normally not to open the slot at the base of the furrow, which is accomplished by the action of coulter 34. Its purpose is to refine the configuration of the slot and to maintain it in an open and carefully defined shape for accurate seed placement at a preselected depth behind the runner.

The planted seeds are covered within slot 30 by subsequent rolling passage of a packing wheel 22 that trails behind the supporting shank 16. The packing wheel assembly is typically spring-biased to apply covering pressure to soil above the planted seeds. The structure and operation of such packing wheels is well known in seed drill technology. Further details concerning this element are not believed to be necessary for an understanding of the present improvements.

While the rolling action of press wheels 10 and coulter 34 alone might be used in a "no-till" seeding procedure where seeding is accomplished under relatively shallow conditions, in most instances the described planting assembly will be used in conjunction with a longitudinally aligned opener, such as the illustrated shovel 18 or a conventional coulter assembly (not shown).

Figure 12:
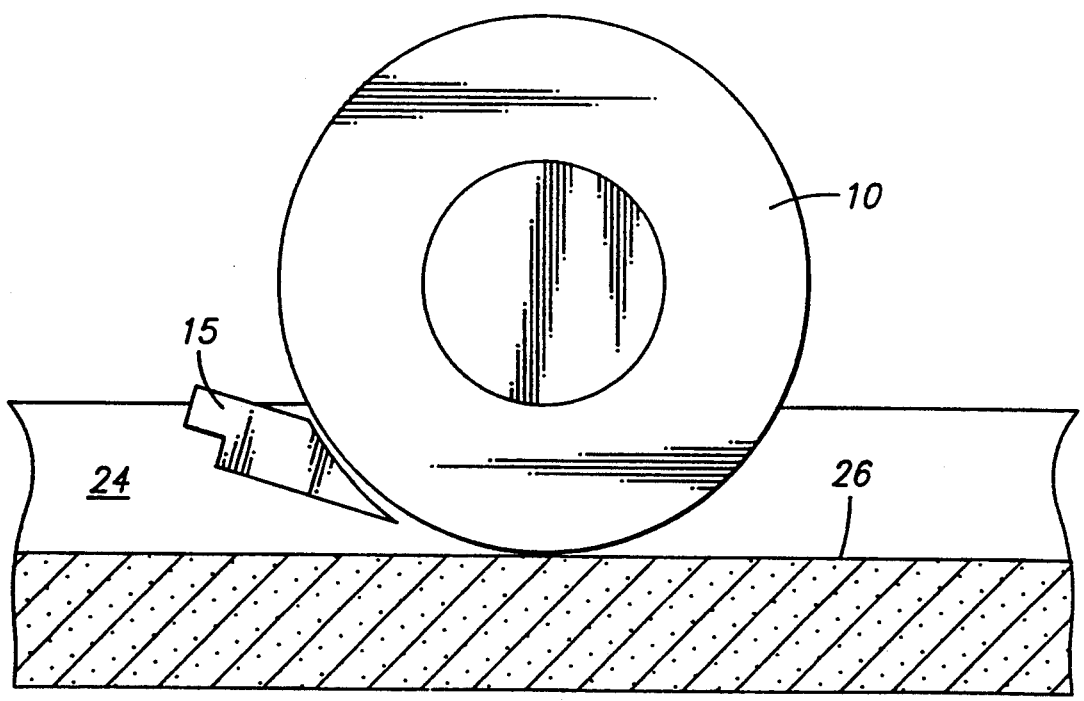
Figure 13:
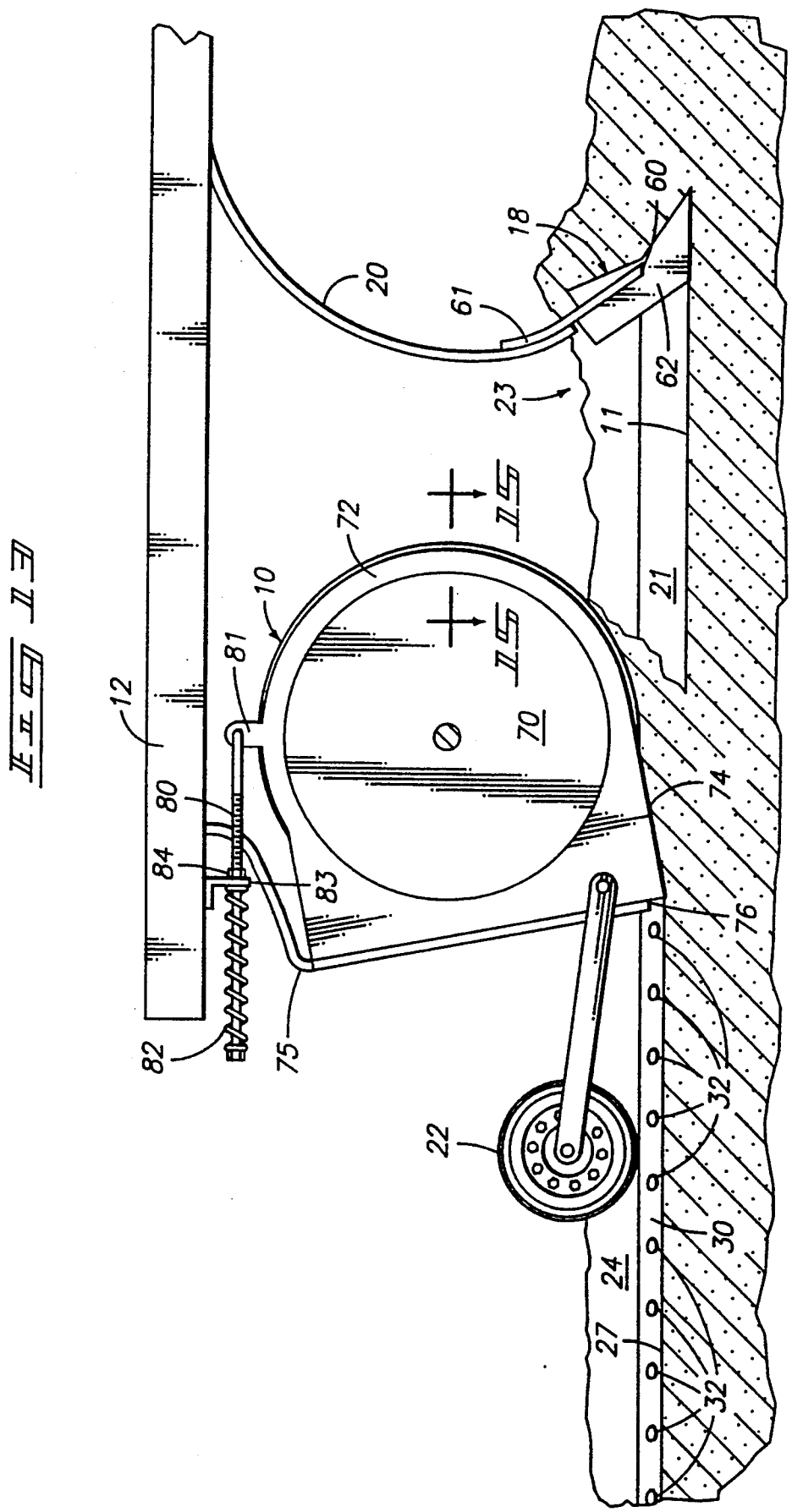
FIG. 13 is a side view of a second embodiment of the planting assembly with the facing press wheel removed.

The details of shovel 18 are best understood by reference to FIGS. 12-14. The illustrated shovel 18 is mounted to frame 12 by means of a conventional spring gooseneck 20. The shovels 18 associated with adjacent pairs of press wheels 10 will normally be longitudinally staggered on the supporting frame 12 to minimize disruption of the furrows as they are being dug by passage of the shovels.

Each shovel 18 includes a forwardly-facing tapered upright plate 58. Plate 58 is transversely symmetrical across a longitudinal vertical center line through shovel 18. Its side edges 59 are wider across a horizontal lower plate edge 60 than across the upper end of plate 58, where plate 58 is bolted to a lower end of a spring gooseneck 20. The plate 58 has a planar transverse front surface 61 leading downwardly and forwardly between its upright side edges 59 to the lower edge 60 to cut a longitudinal furrow during forward movement of the plate through soil.

A vertical blade 62 extends rearwardly from the plate 58 to structurally reinforce it. Blade 62 also protrudes downwardly from the lower edge 60 to cut an open longitudinal slot intersecting the face of the dug furrow. The protruding section of blade 62 includes a sharp point formed between a front edge 63 and a substantially horizontal bottom edge 64. The slotting action of blade 62 is similar to that described in my earlier U.S. Pat. Nos. 3,177,830, 3,319,590 and 3,385,243, although the vertical dimension of the slotting blade structure is substantially greater than that previously utilized.

A three-dimensional triangular deflector 65 protrudes forwardly from the front surface 61 of upright plate 58. Deflector 65 is spaced inwardly from the side edges 59 of the plate 58. It has converging side surfaces 66 leading between the front surface 61 of plate 58 and an apex that is vertically aligned with the longitudinal center line of shovel 18. The width of the side surfaces 66 is tapered from top to bottom, the maximum width being positioned at their top ends. Deflector 65 urges soil upwardly and transversely outward during passage shovel 18 through soil.

The purpose of deflector 65 is to urge moist soil loosened in the furrow by the scraping action of the lower edge 60 across the sides of plate 58. This loosened moist soil is therefore urged across the side edges 59 of plate 58 to provide a covering along the sides of the opened furrow. Subsequent packing of the furrow sides by rolling action of press wheels 10 will result in a firm crust of moist soil covering the sides of the packed furrow to hold the furrow in a relatively accurate configuration without further support. The packed moist soil along the sides of the furrow will substantially overcome the normal tendency of the furrow sides to slide downwardly and add to the depth of covering soil located over the planted seeds.

Shovel 18 can also be utilized for placement of fertilizer within the formed furrows. By turning a fertilizer delivery tube along the back edge of vertical blade 62, one can deposit solid, gaseous or liquid fertilizer in the base of the slot formed by it. The rear edge of blade 62 is notched to provide access for such fertilizer delivery. The deposition of fertilizer by furrow openers is well known in agricultural practice and no further details concerning this feature are believed to be necessary herein.

Figure 1:
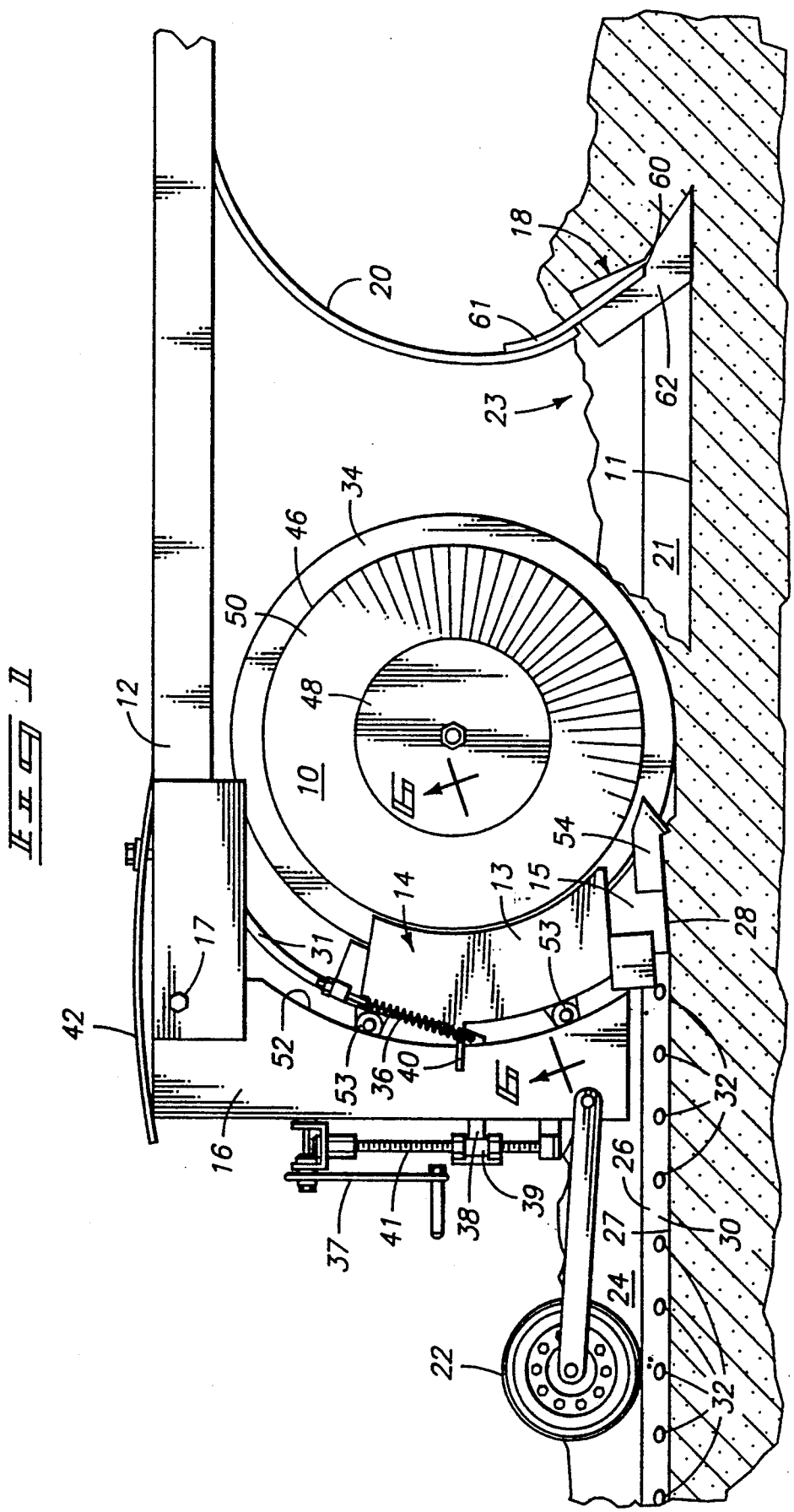
FIG. 1 is a fragmentary side elevation view of the seed drill illustrating planting of seed under normal field conditions.
Figure 2:
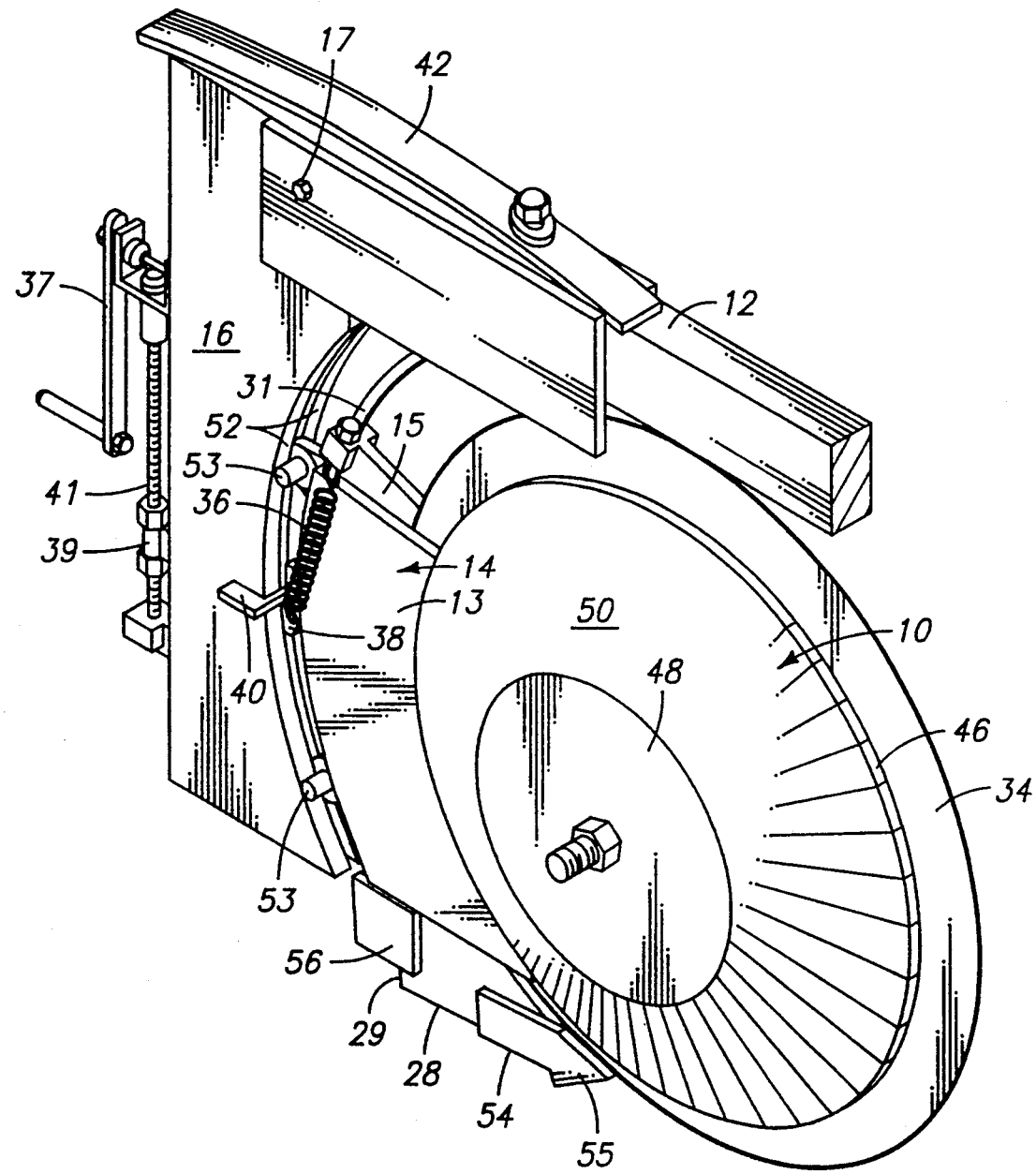
FIG. 2 is a perspective view of the planting assembly.
Figure 3:
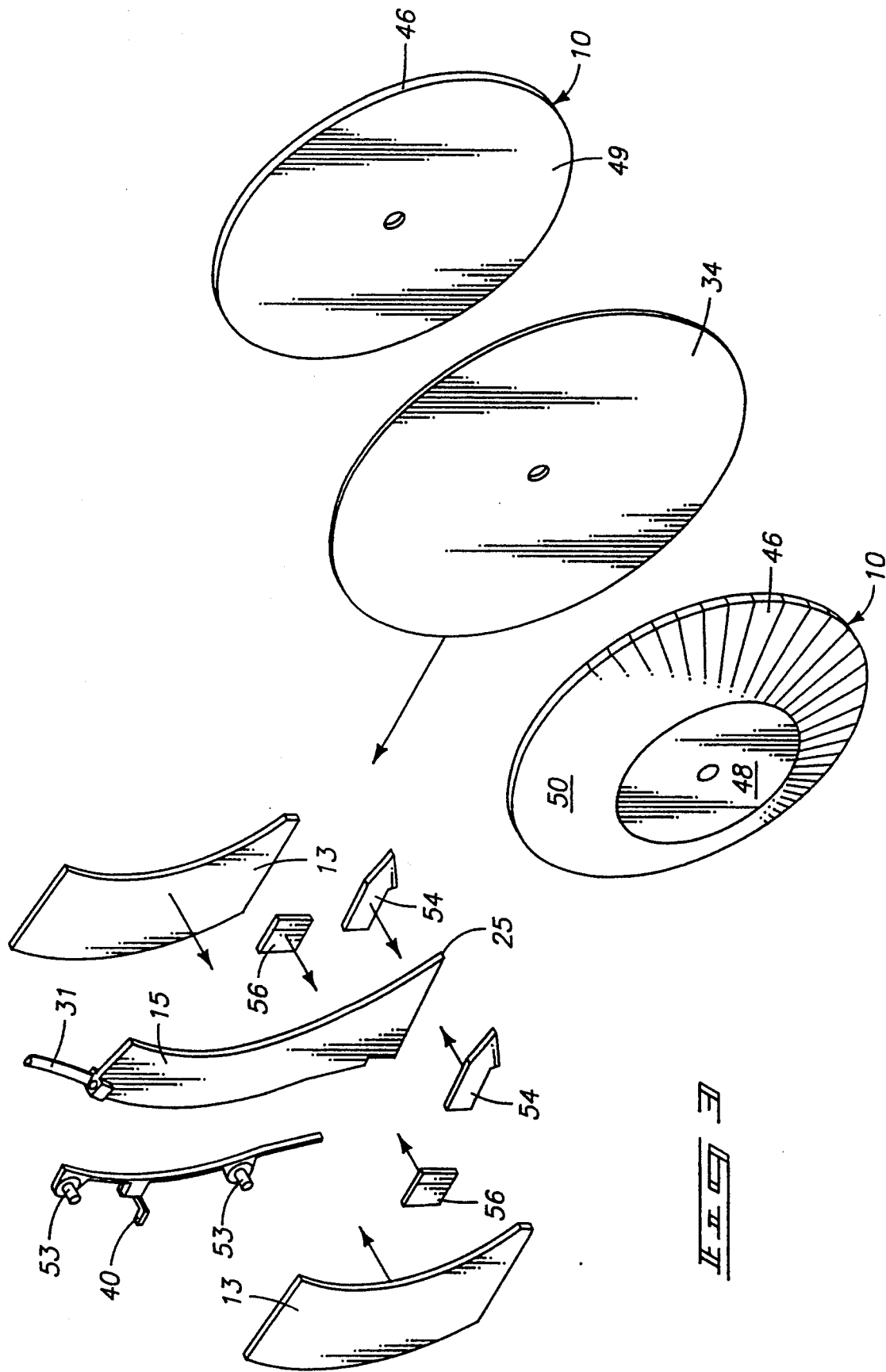
FIG. 3 is an exploded perspective view of the press wheel and boot.

Furrow formation and seed deposition can best be understood from a study of FIG. 1. The initial furrow is produced by passage of shovel 18 or some other form of conventional opener, such as double disk coulter. Shovel 18 forms a rough open furrow 23 whose sides are covered by loose moist soil. An extended slot 21, produced by action of pending shovel blade 62, extends vertically from the furrow base (defined by passage of lower edge 60 on shovel 18) and a slot bottom surface 11. If the rough furrow 23 is formed by a double disk coulter or other opener, the cut soil might extend in a continuous slot from the field surface to the elevation indicated in FIG. 1 by the reference numeral 11.

The subsequent rolling action of press wheels 10 will pack the furrow sides 24 in a predefined sloping configuration. The sides will be firmed in a shape-retaining manner because of the covering of moist soil provided by action of the disclosed shovel 18. The rolling pressure of press wheels 10 will also close the slot 21. In the embodiment of the invention, the slot is then partially reestablished by the cutting action of rolling coulter 34.

The side walls of the newly reestablished slot are immediately disrupted by wings 55 on the overlapping points 54 at both sides of runner 28. This fills the slot, except where the slot is filled by the downwardly projecting structure of runner 28. Sliding passage of runner 28 subsequently smooth the sides and bottom surface 27 of the side-receiving slot that is open immediately behind runner 28.

Figure 4:
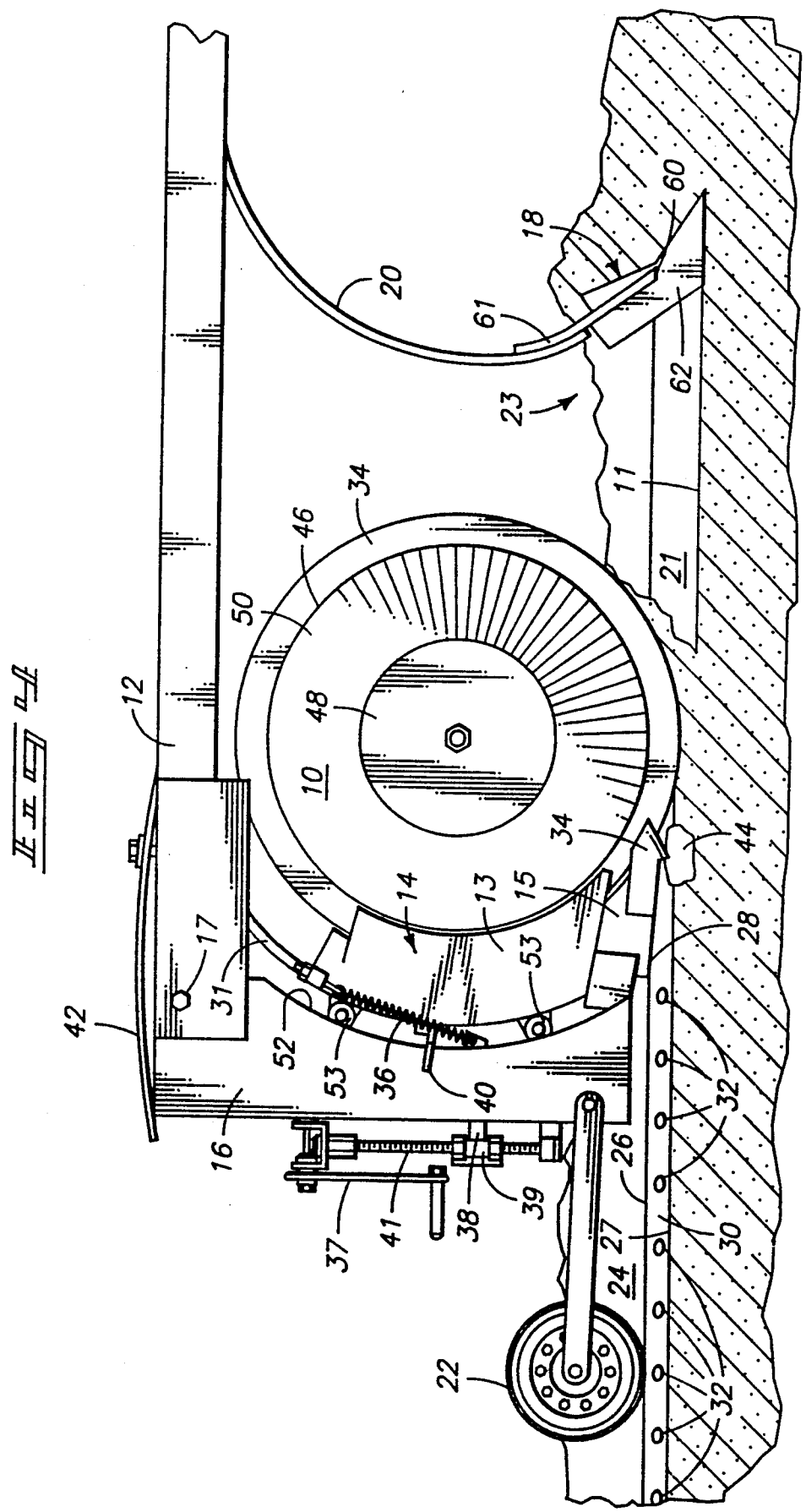
FIG. 4 is a view similar to FIG. 1, showing the runner in an elevated position.
Figure 5:
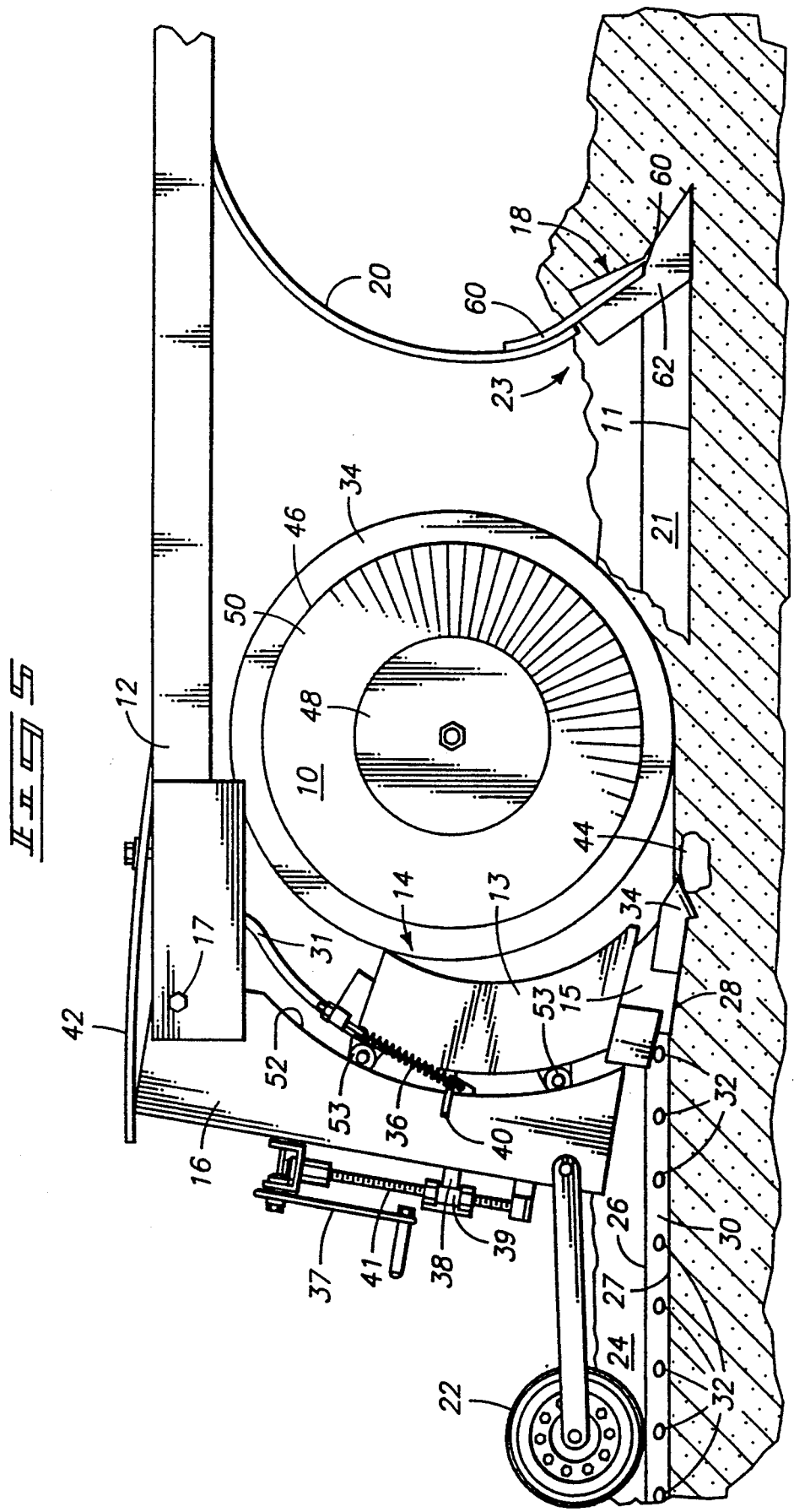
FIG. 5 is a view similar to FIG. 1, showing movement of the boot in response to engagement of an obstacle.

In operation, as illustrated in FIGS. 1, 4 and 5, the shovel 18, press wheels 10, coulter 34, boot 14 and runner 28 act cooperatively to assure highly accurate depth placement of seeds 32 at the base of the packed furrow.

The working depth relationship between these elements is shown in FIG. 1. It can be adjusted directly by raising or lowering collar 39 along its supporting crankshaft 41. With the yoke 40 engaged across the upper surface of bar 38 due to the tension applied by springs 36, boot 14 should maintain the bottom edge of runner 28 at an elevation such that its lowermost elevation is somewhat above the lowermost elevation of the circular coulter 34. Similarly, the downward extension of vertical blade 62 from the lower edge 60 of plate 58 in shovel 18 is greater than the radial dimension of coulter 34 that protrudes from the press wheel rims 46.

With the lower edge 60 across shovel 18 preset to an elevation substantially identical to the elevation of press wheel rims 46, the bottom of the slot produced by passage of shovel blade 62 will be at an elevation beneath the slot formed by rolling action of coulter 34. Thus, placement of fertilizer behind the shovel blade 62 can take place at an elevation below that at which seed is deposited behind runner 28. Fertilizer placed behind shovel 18 will be covered by loose soil falling within the newly-opened furrow, as well as by the subsequent rolling action of press wheels 10 and coulter 34, which support the weight of the seed drill. This will pack soil above the fertilizer and prevent subsequent intermixing of fertilizer and seed.

When adjusting the seed drill for normal usage during planting procedures, the elevational position of each shovel 18 on frame 12 is selected so as to maintain the horizontal lower edge 60 below the soil moisture line at all times. This is accomplished by adjustment of a conventional linkage support system (not shown) on the conventional seed drill frame 12. With the shovels 18 at this depth, the rims 46 of press wheel 10 will roll along the open furrow at the same elevation as the lower edge 60 of the aligned shovel 18. Since the rims 46 define the base 26 of the packed furrow, one can then adjust the elevation of boot 14 relative to press wheels 10 by operation of crank 37. The elevation of the lowermost edge along runner 28 can be adjusted to any elevation be slightly above the lowermost elevation of the coulter 34.

With the elements adjusted as just described, the base 26 of the furrow will remain in moist soil. The sides of the furrow will have moist soil deflected over them by operation of deflector 65 and front surface 61 of shovel 18. An open slot will be formed behind the shovel blade 62 to an elevation below the lowermost elevation of the periphery of coulter 34. The slot will be partially filled behind the shovel 18 and the portions of it under coulter 34 will be filled by rolling passage of press wheels 10 and coulter 34. Rolling movement of coulter 34 will reopen and redefine the soil slot at the base of the furrow and produce an open slot structure within which the runner 28 can slide as the seed drill travels longitudinally through the field.

The close proximity of runner 28 to the perimeter of coulter 34 substantially prevents any soil from falling into that portion of the slot filled by the runner 28 until passage of the runner has been completed. Seed is dropped immediately behind runner 28 and is accurately deposited at the selected depth within the open slot 30 prior to being covered by passage of packing wheel 22, which rolls along the base 26 of the furrow.

Because soil conditions vary about a field, the actual elevation of runner 28 can change slightly as more or less soil resistance is encountered by the runner 28. Boot 14 will pivot upwardly about the arc centered on the transverse press wheel axis to maintain even pressure against the subsoil structure. This amount of movement is relatively slight, and is shown to an exaggerated degree in FIG. 4.

When a subsoil obstacle, such as the rock 44 (FIG. 4) is encountered, the boot 14 and runner 28 are free to move both upwardly and rearwardly as required to clear it. The rearward force against the rock 44 would otherwise cause structural damage to the seeding assembly components. Boot 14 not only moves upwardly relative to shank 16 (in opposition to tension springs 36), but also swings rearwardly against the yieldable mounting of shank 16 (in opposition to leaf spring 42). As soon as the obstacle has been overcome, the springs will return boot 14 and shank 16 to their normal working positions.

It is important to note the accurate longitudinal alignment of the various components. The shovel blade 62, the vertical coulter 34 and the runner 28 are at all times in longitudinal alignment with one another. The critical alignment of runner 28 and coulter 34 is assured by the fact that boot 14 straddles the sides of coulter 34 and cannot be displaced by turning forces or other resistance encountered in the soil being worked. The result of this alignment is not only careful preparation of the seed-receiving slot, but also accurate seed placement within the slot at the rear of runner 28.

As previously mentioned, the described components lend themselves readily to placement of fertilizer at the back of the shovel blade 62. In addition, the mechanical disturbance of soil to an elevation below the seed planting depth tends to aerate the soil, which seems to destroy some of the organisms damaging to germinating plants.

FIGS. 13-15 show a variation of the runner 28. In this arrangement the press wheels 10 are separated by a solid circular disk 70 sandwiched between them. The outer diameter of disk 70 is less than the outer diameter of the press wheel rims 46. The resulting slot between the press wheel rims 46 rotatably receives a circumferential ring 72 transversely centered within the press wheels 10. The circumference of ring 72 is preferably recessed slightly from the adjacent press wheel rims 46 so as to not interfere with the ability of the press wheels 10 to roll through field trash without collecting it on the non-rotating ring 72.

Runner 28 is formed integrally with ring 72 and extends rearwardly from beneath the press wheels 10, as shown in FIGS. 13 and 14. Its upright rear edge is provided with a flexible seed delivery tube 75 running to its lower edge. The lower end of seed delivery tube 75 opens immediately behind the runner 28. It also might be overlapped by thin protective side plates, as previously described with respect to the structure of plates 78 provided along runner 28.

Provision can be made to yieldably support ring 72 and runner 28 relative to frame 12. As an example, a longitudinal rod 80 is shown pivoted to a protruding ear 81 at the upper portion of ring 72. The rear end of rod 80 is enlarged and abutted by a compression spring 82 positioned between the rear end of rod 80 and a depending bracket 83 on frame 12. A threaded nut 84 surrounding the rod 80 can be adjusted to preset the normal working elevation of runner 28 relative to the press wheels 10 and frame 12.

In this arrangement, the circumferential groove formed about the press wheels 10 directly guides the runner 28. The spring 82, rod 80 and associated elements provide yieldable means operably connected to the runner 28 for normally biasing runner 28 to a working position within the slot 30 and for allowing runner 28 to move upwardly about the transverse axis of the press wheels 10 in response to engaged soil resistance or encountered obstacles. The working position or elevation of runner 28 is defined by the adjustable nut 84.

Except in very shallow planting situations within fields that have been carefully prepared, the second embodiment shown in FIGS. 13–15 will require formation of a furrow and open slot by a preceding opener, such as the shovel 18 shown in FIGS. 1 and 16–18. The depending runner 28 will then reestablish the confines of the slot immediately prior to deposition of seeds within it.

Figure 9:
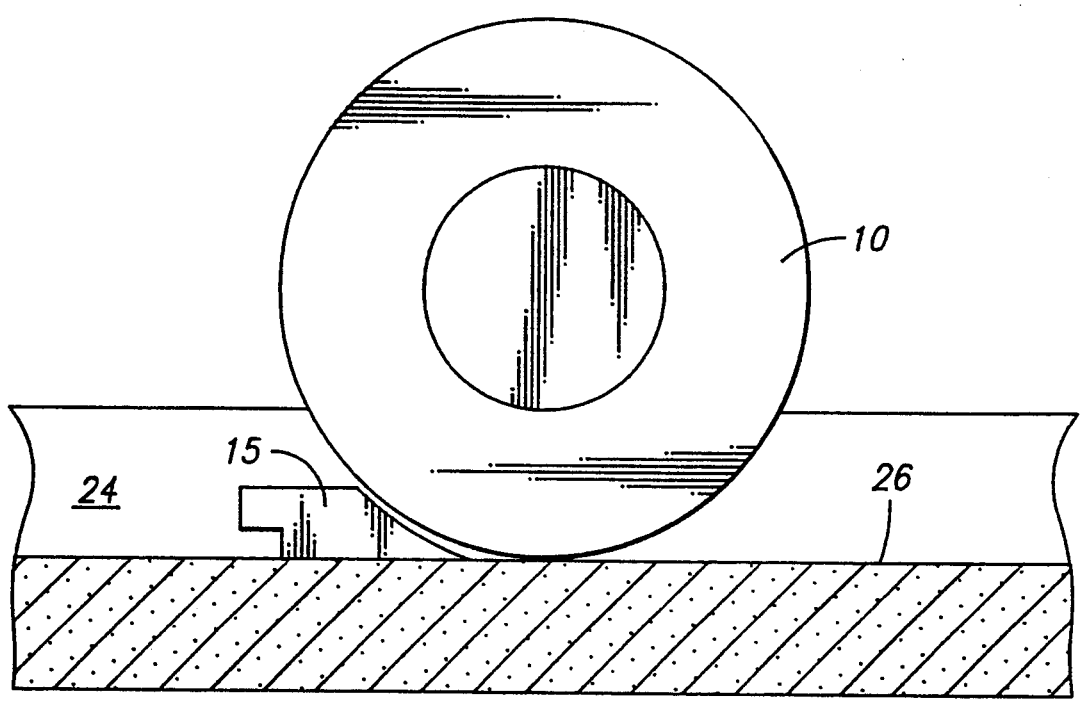
FIGS. 9-12 are fragmentary diagrammatic views illustrating runnerpress wheel relationships in the first embodiment of the drill.
Figure 10:
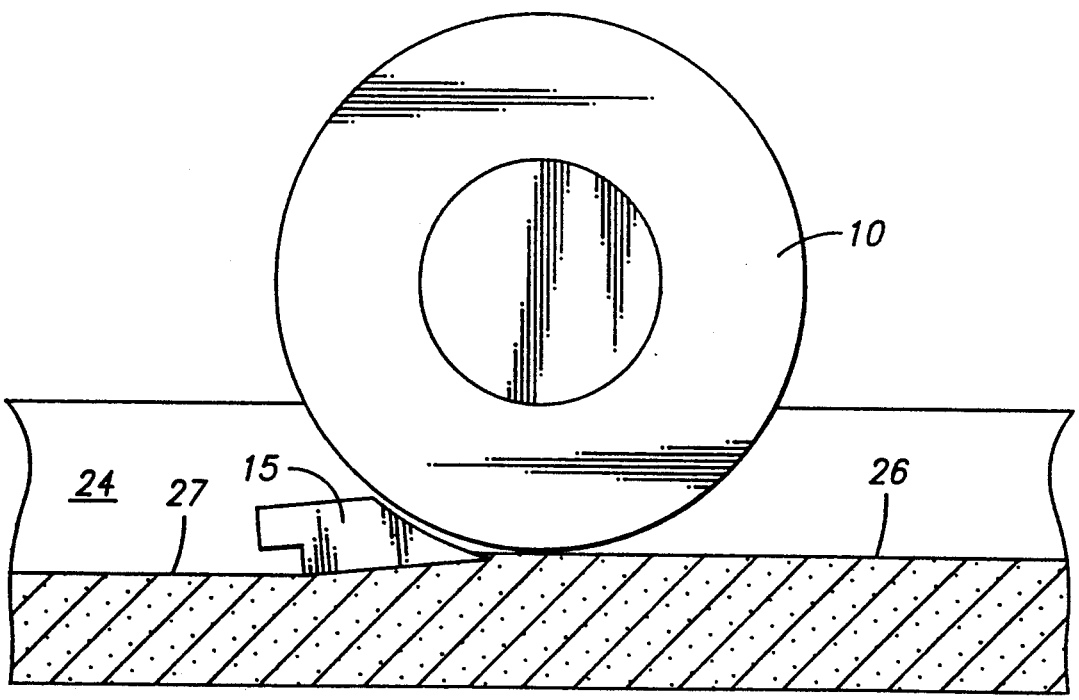
Figure 11:
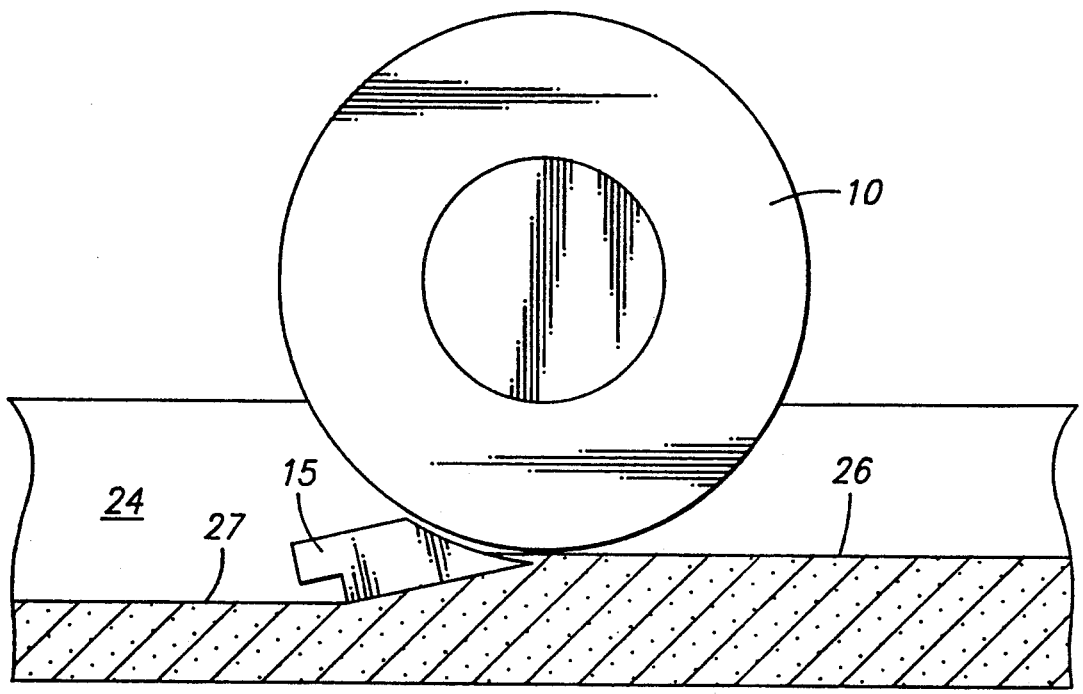

FIGS. 9–12 diagrammatically illustrate a preferred spatial relationship between the press wheels 10 and runner 28 in both embodiments of the invention. As shown in FIG. 9, the runner 28 should be supported so that its bottom edge is positionable in a plane coincident with the plane of base 26 across the packed furrow after rolling engagement by press wheels 10. From this position, the runner 28 can be lowered about the arc centered at the rotational axis of press wheels 10 to establish a planting depth for the seeds. As runner 28 pivots about the press wheel axis, its rear edge will define the maximum slot depth formed by its sliding passage through the soil. This depth can be accurately gauged because it is a direct function of the position of the supporting boot or ring that guides the runner 28 relative to the press wheels 10. FIG. 10 shows the runner 28 forming a very shallow seed-receiving slot. FIG. 11 shows a deep planting position. In addition, runner 28 can be raised relative to the axis of press wheels 10 to a transport position (FIG. 12) where it is elevated for movement about a field without contacting the soil surface.

It is to be understood that the described planting assemblies are to be used in multiple positions across a seed drill for simultaneously seeding a plurality of rows. While the runners 28 will normally be set at a common elevation relative to the supporting framework of a seed drill, the described support system for the individual runners 28 will permit them to be individually adjusted if necessary. For instance, a runner 28 lined with vehicle wheel marks in the field might be elevationally set at a height slightly different from the height of adjacent runners engaging soil that is not packed.

In compliance with the statute, the invention has been described in language more or less specific as to structural features. However, the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A seed drill planting assembly comprising:
   press wheel means rotatably mounted about a transverse axis for packing a longitudinal furrow;
   the press wheel means further including a circumferential coulter;
   a runner extending rearwardly from beneath the press wheel means, the runner being transversely guided on the circumferential coulter of the press wheel means to maintain it in longitudinal alignment within the furrow while forming a vertical slot that intersects the longitudinal furrow; and
   delivery means on the runner for dropping seed into the vertical slot.

2. The planting assembly of claim 1 further comprising:
   yieldable means for normally biasing the runner to a working position within the slot and for allowing the runner to move elevationally in response to engagement of an obstacle.

3. The planting assembly of claim 1 wherein the runner is mounted for angular movement along an arc centered about the transverse axis;
   the planting assembly further comprising:
   yieldable means for normally biasing the runner to a working angular position along the arc and for allowing upward angular movement of the runner along the arc in response to engaged soil resistance.

4. A seed drill planting assembly comprising:
   press wheel means rotatably mounted about a transverse axis for packing a longitudinal furrow;
   the press wheel means further including a circumferential groove;
   a runner extending rearwardly from beneath the press wheel means, the runner being transversely guided on the circumferential groove of the press wheel means to maintain it in longitudinal alignment within the furrow while forming a vertical slot that intersects the longitudinal furrow; and
   delivery means on the runner for dropping seed into the vertical slot.

5. The planting assembly of claim 4 wherein the runner is operably guided within the groove.

6. The planting assembly of claim 4 and further comprising:
   a circumferential ring pivotally mounted within the groove;
   the runner being integral with the circumferential ring.

7. The planting assembly of claim 4 wherein the runner is operably mounted within the groove for pivotal motion about the transverse axis; and
   yieldable means operably connected to the runner for normally biasing the runner to a working position within the slot and for allowing the runner to move upwardly about the transverse axis in response to engaged soil resistance.

8. The planting assembly of claim 4 wherein the runner is operably mounted within the groove for pivotal motion about the transverse axis;
   yieldable means operably connected to the runner for normally biasing the runner to a working position within the groove and for allowing the runner to move upwardly about the transverse axis in response to engaged soil resistance; and
   limit means operably connected to the runner for defining the working position of the runner.

9. The planting assembly of claim 4 further comprising:
   yieldable means for normally biasing the runner to a working position within the slot and for allowing the runner to move elevationally in response to engagement of an obstacle.

10. The planting assembly of claim 4 wherein the runner is mounted for angular movement along an arc centered about the transverse axis;
    the planting assembly further comprising:
    yieldable means for normally biasing the runner to a working angular position along the arc and for allowing upward angular movement of the runner along the arc in response to engaged soil resistance.

11. A seed drill planting assembly comprising:
    press wheel means rotatably mounted about a transverse axis for packing a longitudinal furrow;

the press wheel means further including a circumferential coulter;

a runner extending rearwardly from beneath the press wheel means, the runner being transversely guided on the circumferential coulter of the press wheel means to maintain it in longitudinal alignment within the furrow while forming a vertical slot that intersects the longitudinal furrow;

delivery means on the runner for dropping seed into the vertical slot; and an upright boot straddling side surfaces on the coulter at a location behind the press wheel means;

the runner being located at the lower end of the upright boot.

12. The planting assembly of claim 11, and further comprising:

shank means engaged behind the upright boot for yieldably urging the boot in a forward direction toward the press wheel means.

13. The planting assembly of claim 11, and further comprising:

shank means engaged behind the boot for yieldably urging the boot in a forward direction toward the press wheel means; and yieldable means operably connected between the boot and the shank means for normally biasing the runner to a working position within the slot and for allowing the runner to move upwardly relative to the shank means in response to engaged soil resistance.

14. The planting assembly of claim 11, and further comprising:

yieldable means operably connected to the boot for normally biasing the boot downwardly to maintain the runner in a working position within the slot and for allowing the boot and runner to move upwardly in response to engaged soil resistance; and limit means for defining the working position of the boot and runner.

15. The planting assembly of claim 11, and further comprising:

shank means engaged behind the boot for yieldably urging the boot in a forward direction toward the press wheel means;

yieldable means operably connected between the boot and the shank means for normally biasing the boot downwardly to maintain the runner in a working position within the slot and for allowing the boot and runner to move upwardly relative to the shank means in response to engaged soil resistance; and elevationally adjustable limit means operably connected between the boot and the shank means for defining the working position of the boot and runner relative to the shank.

16. A seed drill planting assembly comprising:

a press wheel assembly rotatably mounted about a transverse press wheel axis for rolling ground engagement;

the press wheel assembly including a pair of press wheel elements each having a circular rim centered about a press wheel axis, the circular rims of the press wheel elements being transversely spaced apart from one another for rolling ground engagement;

a runner extending downwardly and rearwardly from beneath the press wheel assembly;

guide means operably engaged between the runner and the press wheel assembly for transversely guiding the runner on the press wheel assembly to maintain it transversely centered between the press wheel elements while forming a vertical slot; and delivery means on the runner for dropping seed into the vertical slot.

17. The planting assembly of claim 16, further comprising:

furrow forming means for opening a longitudinal furrow forwardly of the press wheel assembly.

18. The planting assembly of claim 16, further comprising:

furrow forming means for opening a longitudinal furrow forwardly of the press wheel means; and the furrow forming means including slot forming means for cutting a vertical slot longitudinally through the longitudinal furrow, the slot forming means comprising:

a vertical blade extending downwardly from the furrow forming means.

19. A seed drill planting assembly comprising:

a press wheel assembly rotatably mounted about a transverse press wheel axis for rolling engagement within a furrow to pack angular furrow sides leading downwardly to a furrow base;

the press wheel assembly including slot forming means for cutting a vertical slot longitudinally through the furrow base;

a runner extending downwardly and rearwardly from beneath the press wheel assembly, the runner being transversely guided on the press wheel assembly to maintain it in longitudinal alignment within the vertical slot; and delivery means on the runner for dropping seed into the vertical slot;

the slot forming means comprising:

a circumferential coulter projecting radially outward about the press wheel assembly, the coulter being rotatable in unison with the press wheel assembly.

20. The planting assembly of claim 19, further comprising:

an upright boot overlapping opposed side surfaces of the coulter;

the runner being located at the lower end of the upright boot; and shank means engaged behind the upright boot for yieldably urging the upright boot toward the press wheel means.

21. A seed drill planting assembly, comprising:

press wheel means including opposed angular press wheel surfaces, the press wheel means being rotatably mounted about a transverse axis for packing angular furrow sides leading downwardly to a base along a longitudinal open furrow;

the press wheel means further comprising a circumferential coulter projecting radially outward from between the angular press wheel surfaces, the coulter being rotatable about the transverse axis in unison with the angular press wheel surfaces to form an open longitudinal slot along the base of the longitudinal open furrow;

a runner extending rearwardly from beneath the press wheel means, the forward end of the runner being adjacent to the rim of the coulter;

guide means operably engaged between the runner and the coulter for transversely guiding the runner on the coulter to maintain it in longitudinal alignment within the slot; and delivery means on the runner for dropping seed into the slot.

22. The planting assembly of claim 21, comprising:
an upright boot straddling the coulter at a location behind the press wheel means;
the runner being located at a lower end of the upright boot; and
shank means engaged behind the upright boot for yieldably urging the upright boot toward the press wheel means.

23. The planting assembly of claim 21, comprising:
an upright boot straddling the coulter at a location behind the press wheel means;
the runner being located at a lower end of the upright boot;
shank means engaged behind the upright boot for yieldably urging the upright boot toward the press wheel means;
yieldable means operably connected between the boot and the shank means for normally biasing the boot downwardly to maintain the runner in a working position within the slot and for allowing the boot and runner to move upwardly relative to the shank means in response to engaged soil resistance; and
limit means operably connected between the boot and the shank means for defining the working position of the boot and runner relative to the shank.

24. A seed drill planting assembly, comprising:
press wheel means including opposed angular wheel surfaces leading to a circumferential groove, the press wheel means being rotatably mounted about a transverse axis for packing angular furrow sides leading downwardly to a base along a longitudinal open furrow;
furrow forming means for opening the longitudinal furrow forwardly of the press wheel means, the base of the longitudinal furrow being intersected by an open longitudinal slot;
a runner operably guided within the circumferential groove of the press wheel means and extending rearwardly from beneath the press wheel means in longitudinal alignment with the open longitudinal slot; and
delivery means on the runner for dropping seed into the open longitudinal slot.

25. The planting assembly of claim 24, further comprising:
a circumferential ring pivotally mounted within the groove;
the runner being formed integrally with the circumferential ring.

26. The planting assembly of claim 24, further comprising:
a circumferential ring pivotally mounted within the groove;
the runner being formed integrally with the circumferential ring;
the planting assembly further comprising:
yieldable means for normally biasing the runner to a working angular position about the transverse axis of the press wheel means and for allowing rearward angular movement of the runner about the transverse axis in response to engaged soil resistance.

27. A seed drill planting assembly, comprising:
press wheel means including opposed angular wheel surfaces, the press wheel means being rotatably mounted about a transverse axis for packing angular furrow sides leading downwardly to a base along a longitudinal open furrow;
the press wheel means further comprising a circumferential coulter having opposed side surfaces projecting radially outward from between the opposed angular press wheel surfaces, the coulter being rotatable about the transverse axis of the press wheel means in unison with the opposed angular press wheel surfaces to form a slot along the base of the longitudinal open furrow;
a boot movably guided along the opposed side surfaces of the coulter; and
delivery means on the boot for dropping seed into the slot.

28. The planting assembly of claim 27, further comprising:
shank means engaged behind the boot for yieldably urging the boot toward the press wheel means; and
yieldable means operably connected between the boot and the shank means for normally biasing the boot downwardly and for allowing the boot to move elevationally relative to the shank means.

29. The planting assembly of claim 27, further comprising:
shank means engaged behind the boot for yieldably urging the boot toward the press wheel means;
yieldable means operably connected between the boot and the shank means for normally biasing the boot downwardly and for allowing the boot to move elevationally relative to the shank means; and
limit means operably connected between the boot and the shank means for defining the working position of the boot relative to the shank means.

30. A seed drill planting assembly, comprising:
a pair of oppositely facing press wheel elements for packing a longitudinal open furrow having sloped sides leading downwardly to a furrow base, the press wheel elements each having (a) a circular rim formed about a transverse axis; (b) a coaxial circular wall perpendicular to the transverse axis and offset from the rim along the transverse axis, the diameter of the circular wall being less than the diameter of the rim; and (c) a coaxial conical wall joining the rim and the circular wall, the conical wall being inclined outwardly from the rim;
a circumferential coulter having opposed side surfaces projecting radially outward from between the press wheel elements and leading to a circular coulter periphery to cut a vertical slot between the sloped sides of the furrow as the sloped sides are packed by rolling motion of the coaxial conical walls of the press wheel elements, the coulter being perpendicular to and coaxially centered about the transverse axis with the rims of the press wheel elements leading to the coulter, the outside diameter of the coulter at its circular coulter periphery being greater than the outside diameter of the rim of each press wheel element;
an upright boot mounted behind the press wheel elements and transversely straddling the opposed side surfaces of the coulter; and
a runner extending rearwardly from beneath the press wheel means, the runner being located at the lower end of the upright boot to maintain the runner in longitudinal alignment within the vertical slot, the runner having a forward end adjacent to the circular coulter periphery; and delivery means on the runner for dropping seed into the vertical slot.

31. The seed drill planting assembly of claim 30, further comprising:

adjustable support means for elevationally guiding the upright boot in relation to the coulter.

32. The seed drill planting assembly of claim 30, further comprising:

adjustable support means for elevationally guiding the upright boot along an arc centered about the transverse axis.

33. The seed drill planting assembly of claim 30, further comprising:

yieldable means operably connected to the upright boot for biasing the upright boot downwardly to a working elevational position behind the coulter and for allowing the upright boot to move rearwardly and upwardly in response to engaged soil resistance.

34. The seed drill planting assembly of claim 30, further comprising:

adjustable support means for elevationally guiding the upright boot in relation to the coulter; and yieldable means operably connected to the upright boot for biasing the upright boot downwardly to a working elevational position behind the coulter and for allowing the upright boot to move rearwardly and upwardly in response to engaged soil resistance.

35. The seed drill planting assembly of claim 30, further comprising:

support means for mounting the upright boot rearwardly of the coulter and for elevationally adjusting the upright boot along an arc centered about the transverse axis; and yieldable means operably connected to the upright boot for biasing the upright boot downwardly to a working elevational position behind the coulter and for allowing the upright boot to move rearwardly and upwardly along the arc in response to engaged soil resistance.

36. In combination with the seed drill planting assembly of claim 30:

shovel means forward of and longitudinally aligned with the coulter for forming the furrow ahead of the press wheel elements, the press wheel elements being aligned to roll through and pack the sloping sides of the furrow.

37. A seed drill planting assembly, comprising:

a pair of oppositely facing press wheel elements for packing a longitudinal open furrow having sloped sides leading downwardly to a furrow base, the press wheel elements each having (a) a circular rim formed about a transverse axis; (b) a coaxial circular wall perpendicular to the transverse axis and offset from the rim along the transverse axis, the diameter of the circular wall being less than the diameter of the rim; and (c) a coaxial conical wall joining the rim and the circular wall, the conical wall being inclined outwardly from the rim;

a circumferential groove formed between the circular rims of the press wheel elements;

a circumferential ring pivotally mounted within the circumferential groove;

an integral runner formed on the ring and extending rearwardly from beneath the press wheel elements to define a vertical slot between the sloped sides of the furrow as the sloped sides are packed by the rotating coaxial conical walls of the press wheel elements; and seed delivery means on the runner for dropping seed into the vertical slot.

38. A seed drill planting assembly, comprising:

a pair of oppositely facing press wheel elements for packing a longitudinal open furrow having sloped sides leading downwardly to a furrow base, the press wheel elements each having (a) a circular rim formed about a transverse axis; (b) a coaxial circular wall perpendicular to the transverse axis and offset from the rim along the transverse axis, the diameter of the circular wall being less than the diameter of the rim; and (c) a coaxial conical wall joining the rim and the circular wall, the conical wall being inclined outwardly from the rim;

a circumferential coulter having opposed side surfaces projecting radially outward from between the press wheel elements and leading to a circular coulter periphery to cut a vertical slot between the sloped sides of the furrow as the sloped sides are packed by rolling motion of the coaxial conical walls of the press wheel elements, the coulter being perpendicular to and coaxially centered about the transverse axis with the rims of the press wheel elements leading to the coulter, the outside diameter of the coulter at its circular coulter periphery being greater than the outside diameter of the rim of each press wheel element;

a boot mounted behind the coulter;

a runner extending rearwardly from beneath the press wheel means, the runner being fixed to the lower end of the boot to maintain it in longitudinal alignment within the vertical slot, the forward end of the runner being adjacent to the circular coulter periphery;

first guide means on the boot engaging the side surfaces of the coulter for maintaining the boot in alignment behind the coulter;

a shank mounted behind the boot;

second guide means interconnecting the boot and the shank for elevationally guiding and supporting the boot along the shank; and delivery means on the runner for dropping seed into the vertical slot.

39. A seed drill, comprising:

a mobile frame;

press wheel means rotatably mounted on the frame about a transverse axis for packing a longitudinal furrow having angular sides leading downwardly to a base;

a runner extending downwardly and rearwardly from beneath the press wheel means;

guide means operably engaged between the runner and the press wheel means for transversely guiding the runner on the press wheel means to maintain it in longitudinal alignment within a vertical slot intersecting the base of the furrow;

support means operably mounting the runner on the frame for angular motion about the transverse axis of the press wheel means; and delivery means on the runner for dropping seed into the vertical slot;

the support means comprising:

an upright boot located behind the press wheel means;

the runner being located at a lower end of the upright boot;

shank means operably engaged between the frame and the upright boot for positioning the upright boot behind the press wheel means with the runner in a working elevation within the vertical slot;

spring means interconnecting the shank means to the frame for yielding resisting motion of the upright boot relative to the frame; and yieldable means operably connected between the shank means and the upright boot for biasing the runner to a working elevation relative to the frame and for allowing elevational movement of the runner from the working elevation in response to engaged soil resistance.

40. A seed drill, comprising:

a mobile frame;

press wheel means rotatably mounted on the frame about a transverse axis for packing a longitudinal furrow having angular sides leading downwardly to a base, the press means including a circumferential coulter;

a runner extending downwardly and rearwardly from beneath the press wheel means;

guide means operably engaged between the runner and the press wheel means for transversely guiding the runner on the press wheel means to maintain it in longitudinal alignment within a vertical slot intersecting the base of the furrow;

support means operably mounting the runner on the frame for angular motion about the transverse axis of the press wheel means; and delivery means on the runner for dropping seed into the vertical slot;

the support means comprising:

an upright boot straddling the coulter at a location behind the press wheel means;

the runner being located at the lower end of the upright boot.

41. The seed drill of claim 40, further comprising:

shovel means mounted to the frame at a location forward of the press wheel means for forming the furrow.

42. The seed drill of claim 40, further comprising:

shovel means mounted to the frame at a location forward of the press wheel means for forming the furrow;

the shovel means comprising:

a shovel support depending from the frame;

a tapered upright plate fixed to a lower end of the shovel support, the tapered upright plate being transversely symmetrical across a longitudinal vertical centerline and having a planar transverse front surface leading downwardly and forwardly between upright side edges to a lower edge; and a vertical blade protruding downwardly from the lower edge of the tapered upright plate.

43. The seed drill of claim 40, further comprising:

shovel means mounted to the frame at a location forward of the press wheel means for forming the furrow;

the shovel means comprising:

a shovel support depending from the frame;

a tapered upright plate fixed to a lower end of the shovel support, the tapered upright plate being transversely symmetrical across a longitudinal vertical centerline and having a planar transverse front surface leading downwardly and forwardly between upright side edges to a lower edge;

a three-dimensional triangular deflector protruding forwardly from the front surface of the tapered upright plate, the deflector being spaced inwardly from the side edges of the tapered upright plate and having converging side surfaces leading between the front surface of the tapered upright plate and an apex that is vertically aligned with the longitudinal centerline of the shovel, the width of the converging side surfaces being tapered from top to bottom;

whereby soil loosened by the scraping action of the lower edge of the tapered upright plate will be urged across its respective side edges by contact with the deflector as the soil moves upwardly over the front surface of the tapered upright plate; and a vertical blade protruding downwardly from the lower edge of the tapered upright plate, the vertical blade being longitudinally aligned with the runner.

44. A seed drill, comprising:

a mobile frame;

press wheel means rotatably mounted on the frame about a transverse axis for packing a longitudinal furrow having angular sides leading downwardly to a base, the press means including a circumferential groove;

a runner extending downwardly and rearwardly from beneath the press wheel means;

guide means operably engaged between the runner and the press wheel means for transversely guiding the runner on the press wheel means to maintain it in longitudinal alignment within a vertical slot intersecting the base of the furrow;

support means operably mounting the runner on the frame for angular motion about the transverse axis of the press wheel means; and delivery means on the runner for dropping seed into the vertical slot;

the support means comprising:

a circumferential ring pivotally mounted within the circumferential groove;

the runner being integral with the ring.

45. A seed drill, comprising:

a mobile frame;

press wheel means rotatably mounted on the frame about a transverse axis for packing a longitudinal furrow having angular sides leading downwardly to a base;

a runner extending downwardly and rearwardly from beneath the press wheel means;

guide means operably engaged between the runner and the press wheel means for transversely guiding the runner on the press wheel means to maintain it in longitudinal alignment within a vertical slot intersecting the base of the furrow;

support means operably mounting the runner on the frame for angular motion about the transverse axis of the press wheel means; and delivery means on the runner for dropping seed into the vertical slot;

the press wheel means comprising:

a pair of oppositely facing press wheel elements for packing a longitudinal open furrow having sloped sides leading downwardly to a furrow base, the press wheel elements each having (a) a circular rim formed about a transverse axis; (b) a coaxial circular wall perpendicular to the transverse axis and offset from the rim along the transverse axis, the diameter of the circular wall being less than the diameter of the rim; and (c) a coaxial conical wall joining the rim and the circular wall, the conical wall being inclined outwardly from the rim;

the seed drill further comprising:

an annular coulter fixed to and projecting radially outward between the press wheel elements, the annular coulter being perpendicular to and coaxially centered about the transverse axis with the rims of the press wheel elements leading to the coulter, the outside diameter of the coulter being greater than the outside diameter of the rim of each press wheel element.

46. A seed drill, comprising:

a mobile frame;

press wheel means rotatably mounted on the frame about a transverse axis for packing a longitudinal furrow having angular sides leading downwardly to a base;

a runner extending downwardly and rearwardly from beneath the press wheel means;

guide means operably engaged between the runner and the press wheel means for transversely guiding the runner on the press wheel means to maintain it in longitudinal alignment within a vertical slot intersecting the base of the furrow;

support means operably mounting the runner on the frame for angular motion about the transverse axis of the press wheel means; and delivery means on the runner for dropping seed into the vertical slot;

the press wheel means comprising:

a pair of oppositely facing press wheel elements for packing a longitudinal open furrow having sloped sides leading downwardly to a furrow base, the press wheel elements each having (a) a circular rim formed about a transverse axis; (b) a coaxial circular wall perpendicular to the transverse axis and offset from the rim along the transverse axis, the diameter of the circular wall being less than the diameter of the rim; and (c) a coaxial conical wall joining the rim and the circular wall, the conical wall being inclined outwardly from the rim;

the seed drill further comprising:

an annular coulter projecting radially outward between the press wheel elements and adapted to rotate in unison with them, the annular coulter being perpendicular to and coaxially centered about the transverse axis with the rims of the press wheel elements leading to the coulter, the outside diameter of the coulter being greater than the outside diameter of the rim of each press wheel element to form a vertical slot through the furrow base in response to rolling engagement of the press wheel elements and coulter within the open furrow; and guide means operably engaged between the runner and the annular coulter for maintaining the runner in a working position behind and in longitudinal alignment with the annular coulter to follow it within the vertical slot.

47. A seed drill planting assembly comprising:

a press wheel assembly including a pair of transversely spaced press wheel elements rotatably mounted about a transverse axis, the press wheel elements each having a rim of a common diameter;

a runner transversely centered between the rims of the press wheel elements and extending rearwardly from beneath the press wheel assembly;

guide means operably engaged between the runner and press wheel assembly for transversely guiding the runner on the press wheel assembly to maintain it in longitudinal alignment between the press wheel elements while forming a vertical slot; and delivery means on the runner for dropping seed into the slot.

* * * * *